(12) United States Patent
Lamb

(10) Patent No.: US 11,275,559 B2
(45) Date of Patent: Mar. 15, 2022

(54) CIRCULAR ACCUMULATOR FOR FLOATING POINT ADDITION

(71) Applicant: QUALCOMM Incorporated, San Diego, CA (US)

(72) Inventor: Aaron Douglass Lamb, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 16/920,242

(22) Filed: Jul. 2, 2020

(65) Prior Publication Data
US 2022/0004362 A1 Jan. 6, 2022

(51) Int. Cl.
*G06F 7/485* (2006.01)
*G06F 5/01* (2006.01)

(52) U.S. Cl.
CPC .............. *G06F 7/485* (2013.01); *G06F 5/012* (2013.01)

(58) Field of Classification Search
CPC .... G06F 5/01–012; G06F 7/485; G06F 7/501; G06F 7/503
See application file for complete search history.

(56) References Cited

U.S. PATENT DOCUMENTS

| 4,872,131 | A | * | 10/1989 | Kubota | ..................... G06F 7/57 708/524 |
| 5,084,834 | A | * | 1/1992 | Hartley | ................... G06F 30/30 708/707 |
| 6,405,233 | B1 | * | 6/2002 | Mathews | .................. G06F 5/01 708/670 |
| 2006/0106903 | A1 | * | 5/2006 | Karaki | .................... G06F 7/505 708/200 |
| 2013/0103732 | A1 | * | 4/2013 | Asanaka | ............... G06F 7/4833 708/505 |

OTHER PUBLICATIONS

Fleurkens, H., and R. Tangelder. "The high level design of the long accumulator chip", Proceedings, Fourth CSI/IEEE International Symposium on VLSI Design, 1991 (Year: 1991).*

* cited by examiner

*Primary Examiner* — Matthew D Sandifer
(74) *Attorney, Agent, or Firm* — Patterson & Sheridan, L.L.P

(57) ABSTRACT

Certain aspects of the present disclosure are directed to methods and apparatus for circular floating point addition. An example method generally includes obtaining a first floating point number represented by a first significand and a first exponent, obtaining a second floating point number represented by a second significand and second exponent, and adding the first floating point number and the second floating point number using a circular accumulator device.

16 Claims, 7 Drawing Sheets

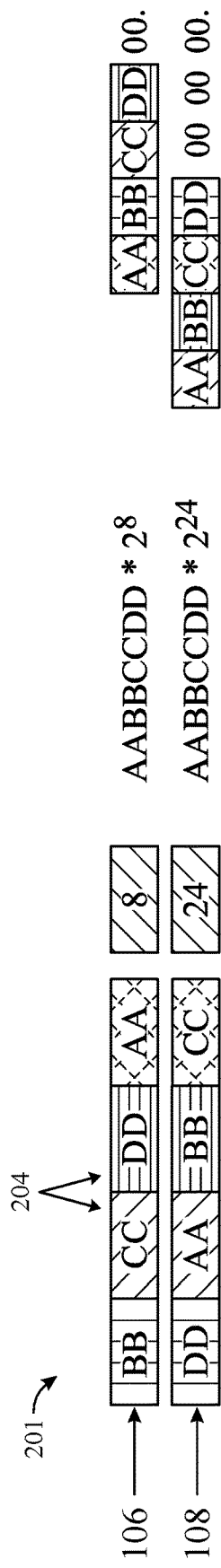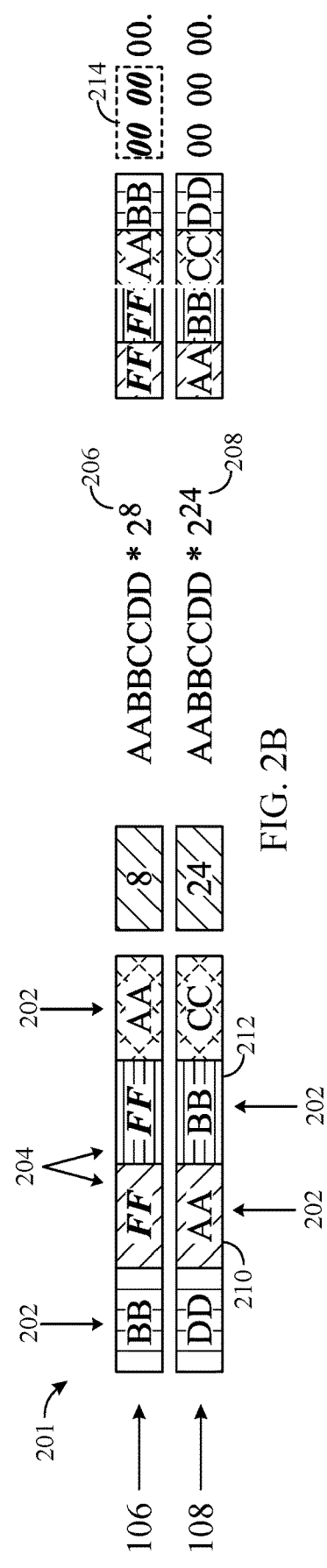
FIG. 2A
FIG. 2B
FIG. 2C

CIRCULAR ACCUMULATOR FOR FLOATING POINT ADDITION

The present disclosure generally relates to hardware for floating point number addition and, more particularly, to a circular accumulator for floating point number addition.

DESCRIPTION OF RELATED ART

A floating point number comprises an exponent portion and a mantissa portion. The exponent portion represents the exponent to which a base number is raised and the actual number is interpreted to be the mantissa portion multiplied by the base number raised to a power specified by the exponent portion. Thus any particular digital number may be expressed as (M,E) where M is a n-digit signed mantissa and E is an m-digit signed integer exponent or $M \times B^E$ where B represents the base number system which in many computer systems is the binary number system where B=2 and in other computer systems B=10 (decimal) or 16 (hexadecimal).

Floating-point arithmetic operations are more complicated for computer processors than those with fixed-point numbers, take more time to execute, and require more complex hardware to implement. In most computers, arithmetic operations are implemented with normalized floating-point numbers, which requires the numbers to be pre-normalized before they can be manipulated. After every intermediate computation step, a post-normalization procedure must be applied to ensure the integrity of the normalized form. Such normalization procedures involve the shifting of bits, which requires complex hardware to accomplish and consumes a significant amount of power and time.

Accordingly, what is needed are techniques and apparatus for reducing normalization procedures for floating point number addition.

BRIEF SUMMARY

Certain aspects of the present disclosure are directed to a method for operating a circular accumulator device for floating point number addition. The method generally includes obtaining a first floating point number represented by a first significand and a first exponent, obtaining a second floating point number represented by a second significand and second exponent, and adding the first floating point number and the second floating point number using the circular accumulator device, the circular accumulator device comprising a plurality of adder devices coupled in series and a plurality of control devices, wherein: each adder device of the plurality of adder devices comprises at least a carry-in input, a carry-out output, a sum output, a first addend input, and a second addend input; the plurality of adder devices comprises at least a first adder device, a last adder device, and a plurality of intermediate adder devices; the plurality of intermediate adder devices are connected in series between the carry-out output of the first adder device and the carry-in input of the last adder device; the carry-out output of the last adder device is coupled with the carry-in input of the first adder device forming a combinatorial loop; each control device of the plurality of control devices comprises a carry-in input, a carry-out output, and a control signal input; and at least one control device of the plurality of control devices is inserted in series between one or more pairs of adder devices of the plurality of adder devices.

Certain aspects of the present disclosure are directed to a circular accumulator device configured for performing floating point number addition. The circular accumulator device generally includes a plurality of adder devices coupled in series and a plurality of control devices, wherein: each adder device of the plurality of adder devices comprises at least a carry-in input, a carry-out output, a sum output, a first addend input, and a second addend input; the plurality of adder devices comprises at least a first adder device, a last adder device, and a plurality of intermediate adder devices; the plurality of intermediate adder devices are connected in series between the carry-out output of the first adder device and the carry-in input of the last adder device; the carry-out output of the last adder device is coupled with the carry-in input of the first adder device forming a combinatorial loop; each control device of the plurality of control devices comprises a carry-in input, a carry-out output, and a control signal input; and at least one control device of the plurality of control devices is inserted in series between one or more pairs of adder devices of the plurality of adder devices Certain aspects of the present disclosure are directed to a non-transitory computer-readable medium for operating a circular accumulator device for floating point number addition. The non-transitory computer-readable medium generally includes instructions that, when executed by at least one processor, cause the at least one processor to obtain a first floating point number represented by a first significand and a first exponent, obtain a second floating point number represented by a second significand and second exponent, and add the first floating point number and the second floating point number using the circular accumulator device, the circular accumulator device comprising a plurality of adder devices coupled in series and a plurality of control devices, wherein: each adder device of the plurality of adder devices comprises at least a carry-in input, a carry-out output, a sum output, a first addend input, and a second addend input; the plurality of adder devices comprises at least a first adder device, a last adder device, and a plurality of intermediate adder devices; the plurality of intermediate adder devices are connected in series between the carry-out output of the first adder device and the carry-in input of the last adder device; the carry-out output of the last adder device is coupled with the carry-in input of the first adder device forming a combinatorial loop; each control device of the plurality of control devices comprises a carry-in input, a carry-out output, and a control signal input; and at least one control device of the plurality of control devices is inserted in series between one or more pairs of adder devices of the plurality of adder devices.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

FIGS. 2A-2C illustrate example operations for circular floating point addition, according to aspects presented herein.

DETAILED DESCRIPTION

Certain aspects of the present disclosure provide methods and apparatus for operating a circular accumulator device for floating point number addition. For example, in some cases, aspects of the present disclosure involve an apparatus for converting two floating point numbers into circular representation and performing floating point addition. In some cases, converting the floating point numbers into circular representation may include shifting a significand associated with one of the floating point numbers based on an exponent associated with the floating point number to generate a circularly-shifted floating point number. Additionally, in some cases, one or more least significant bits having bit-positions in the circularly-shifted floating point number, corresponding to one or more most significant bits of another circularly-shifted floating point number, may be masked off (e.g., by sign extending one or more most significant bits to replace the one or more least significant bits).

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1A:
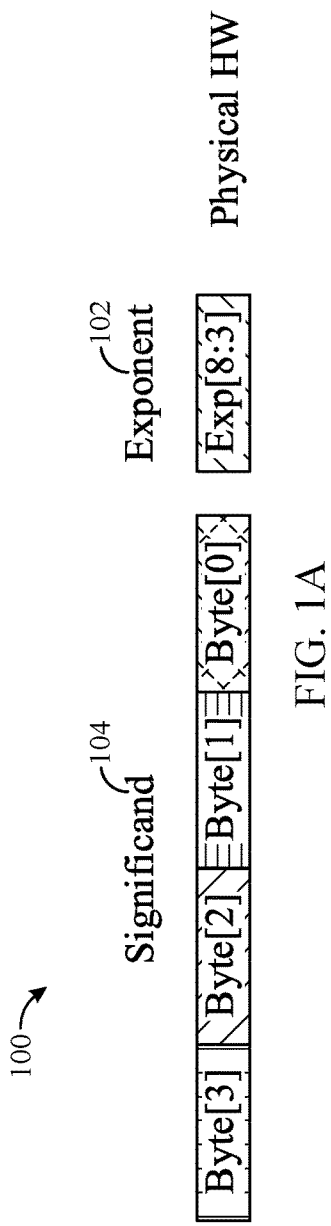
FIG. 1A illustrates an example floating point number representation.

As illustrated in FIG. 1A, a floating point number 100 comprises an exponent portion 102 and a significand portion 104 (also known as a mantissa portion). The exponent portion 102 represents the exponent to which a base number is raised and the actual number is interpreted to be the significand portion 104 multiplied by the base number raised to a power specified by the exponent portion 102. Thus any particular digital number may be expressed as (M,E) where M is a n-digit signed significand and E is an m-digit signed integer exponent or $M \times B^E$ where B represents the base number system which in many computer systems is the binary number system where B=2 and in other computer systems B=10 (decimal) or 16 (hexadecimal).

Figure 1B:
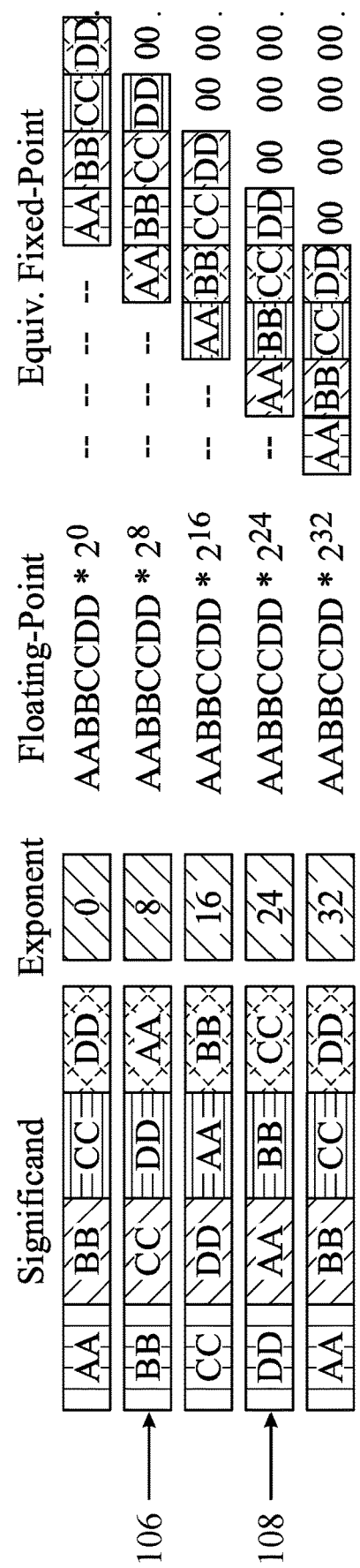
FIG. 1B illustrates different floating point number representations and corresponding fixed point representations.

FIG. 1B illustrates different floating point number representations and corresponding fixed point representations. As illustrated, floating point numbers of differing exponents may be represented using fixed point representation. The term 'fixed point' refers to the corresponding manner in which numbers are represented, with a fixed number of digits after, and sometimes before, the decimal point. For example, as illustrated, assuming a floating point number 106 represented by a significand with a value of AABBCCDD and an exponent with a value of eight, the floating point number 106 may be represented in fixed point form as AABBCCDD and two zeros to the left of the decimal point. Similarly, a floating point number 108 represented by the significand with a value of AABBCCDD and an exponent with a value of 24 may be represented in fixed point form as AABBCCDD and six zeros to the right of the decimal point.

Floating point numbers may be added, subtracted, multiplied or divided. However, floating-point arithmetic operations are more computationally expensive and require more complex hardware than those with fixed-point numbers, take more time to execute, and require more complex hardware to implement. In most computers, arithmetic operations are implemented with normalized floating-point numbers. Therefore, all the numbers must be pre-normalized before they can be manipulated. After every intermediate computation step, a post-normalization procedure must be applied to ensure the integrity of the normalized form.

When addition or subtraction is to be performed, normalized floating point numbers with different exponents are processed by changing the exponents of the digital numbers to be processed until such exponents are the same and shifting the mantissas with respect to each other a corresponding amount (to maintain the values of the two numbers) and then adding, or subtracting if desired, the adjusted mantissas. The resulting sum or difference of the adjusted mantissas when combined with the adjusted exponent is the desired sum or difference, if none of the significant digits in the original mantissas are lost.

For example, when adding two floating point numbers together, such as addend A and addend B, a floating point accumulator device may first determine the larger addend by subtracting the exponent of addend A with the exponent of addend B. If addend A is determined to be the larger addend, the significand of addend B may be right-shifted by the magnitude of the difference of the two exponents to correctly align the MSBs in each addend. As noted above, performing this shifting may require a significant amount of complex logic/hardware and may consume a significant amount of power and time. After addend B is shifted, the significand of addend A and adjusted significand of addend B may be added together. The resulting sum will have an exponent equal to that of addend A. A number of matching most significant bits (MSBs) may then be counted in the significand of the sum, known as sign extension bits. Thereafter, the sign extension bits may be subtracted from the exponent of the sum and the significand arithmetically left-shifted by the number of sign extension bits, which, in the case of a 64-bit significand, may require six different levels of logic also requiring complex wire routing between logic gates.

Accordingly, to help reduce the complexity of the logic/hardware associated with floating point addition, aspects of the present disclosure provide a circular accumulator device configured for floating point addition. For example, in some cases, the circular accumulator may be configured to convert two floating point numbers into circular representation and add the two circularly-represented floating point numbers. Such techniques may help reduce the number of normalization shifts needed after addition as well as shifting to correctly align the MSBs of two floating point addends, thereby simplifying the logic/hardware of the circular accumulator device and resulting in less processing time/cycles and power consumption. For example, in some cases, such techniques may involve connecting a carry out signal of a full adder device associated with a most significant bit with a carry in input of another full adder device associated with a least significant bit, creating a combinatorial loop where, theoretically, any bit could be the MSB, and any physical bit position in the hardware (combinatorial loop) may only represent a unique, mutually-exclusive subset of values by exponent, thereby relaxing a need to shift the two addends to correctly align-by-value the bits within the significand. Instead, techniques presented herein allow the MSB and LSB to be placed sequentially anywhere in the combinatorial loop by including logic to block any particular carry-out of a full adder into a carry in of a next full adder.

FIGS. 2A-2C provide a graphical illustration of the floating point addition with circularly-represented floating point numbers, as described above. For example, as illustrated in FIG. 2A, assume that two floating point number are to be added, such as floating point number 106 and floating point number 108. As illustrated, floating point number 106 may be represented in fixed-point hexadecimal notation by bits 0xAA, 0xBB, 0xCC, and 0xDD, followed by 0x00. Similarly, floating point number 108 may also be represented in fixed-point hexadecimal notation by bits 0xAA, 0xBB, 0xCC, and 0xDD, followed by 0x00, 0x00, and 0x00. Further, as illustrated at 201 in FIGS. 2A and 2B, floating point number 106 and floating point number 108 may be represented by (and stored in memory/hardware using) circular notation. For example, as illustrated, floating point number 106 may be represented in circular notation by bits 0xBB, 0xCC, 0xDD, 0xAA. Similarly, floating point number 108 may be represented in circular notation by bits 0xDD, 0xAA, 0xBB, 0xCC. As noted, the floating point number 106 and floating point number 108 may be stored in memory/hardware in this circular notation, allowing the addition of these two numbers without any additional shifting, as explained below.

In floating point addition, the binary point must be aligned or the bits to be added must be aligned. However, in circular notation/representation, the relevant values 202 to be added from each floating point number 106 and 108, are already aligned, as shown in FIG. 2B. Thus, no intermediate shifting is required. Instead, only 0xCC and 0xDD (illustrated at 204 of FIG. 2A) may be masked (e.g., set to zero) in the floating point number 106 while also sign-extending the floating point number 106, as shown in FIG. 2B. For example, as illustrated, the floating point number 106 may be sign-extended by adding the bits 0xFF and 0xFF (illustrated at 204 in FIG. 2B) in front of 0xAA and 0xBB.

In some cases, the masking of the bits 0xCC and 0xDD of the floating point number 106 may be based on a comparison of the exponents of the floating point numbers 106 and 108. For example, as illustrated in FIG. 2B, since the exponent 206 of the floating point number 106 is less than the exponent 208 of the floating point number 108, bits 0xCC and 0xDD of the floating point number 106 (e.g., which are LSBs) may be masked to ensure that these bits are not added to the bits 0xAA and 0xBB (illustrated at 210 and 212, respectively) of the floating point number 108 (e.g., which are MSBs). For example, after comparing the exponents, the bits "0x00 0x00" illustrated at 214 that are associated with the floating point number 106 shown in FIG. 2B may be produced through a byte-wise logical AND operation. Further, since a first value associated with the floating point number 106 is negative (e.g., the MSB of 0xAA is a '1'), the "0xFF 0xFF" (illustrated at 204 in FIG. 2B) may be produced through a byte-wise logical OR operation (e.g., using the MSB of the next lower byte).

Thereafter, as illustrated in FIG. 2C, the floating point number 106 and the floating point number 108 may be added, resulting in the floating point number AABB7798*10$^{24}$. Note, the 0x01 carry-out bit 204 from the addition. Since, the MSB of 0xAA is also a 0x01, there is no overflow (e.g., significand is not too large to be represented in the existing significand field), and we want to preserve most precision with 0xAABB7798 as the significand of the sum. Additionally, this value may similarly be set up as an addend in another operation without a 32-bit count leading zeros (CLZ) or 32-bit→32-bit right shifter required in typical implementations. However, detecting redundant MSBs may be critical to maintaining accuracy in subsequent operations. This may only require four 9-bit checks with byte-level resolution using fewer levels of parallel logic rather than one 32-bit check with 1-bit resolution that is quite serial in nature. Regardless, no shifting operation to perform normalization may need to occur based upon these checks.

In some cases, if the example used different addends with the carry-out not equal to the MSB, the result may then be, for example, 0xFFAABB77*2$^{32}$ if truncated, or 0xFFAABB78*2$^{32}$ if rounded. Note the sign-extension of the carry-out by a full byte to 0xFF, which may still maintains 24-bits of accuracy.

Figure 3:
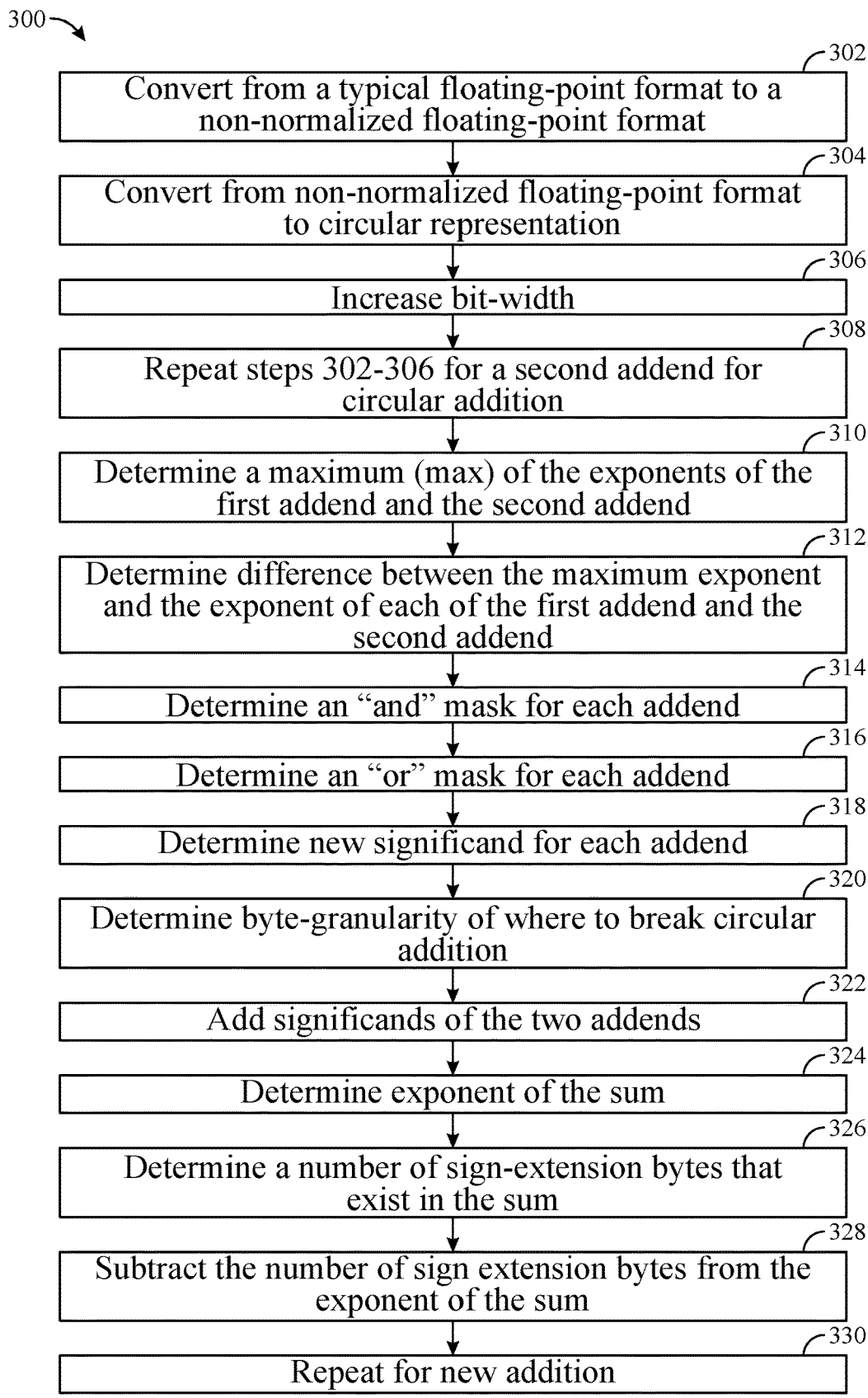
FIG. 3 illustrates example operations for converting two floating point numbers into circular representation and performing floating point addition, according to aspects presented herein.

Aspects of the present disclosure will now discuss example operations 300 illustrated in FIG. 3 for converting two floating point numbers into circular representation and performing floating point addition.

For example, at step 302, the typical floating point format of a first addend (e.g., corresponding to a first floating point number) may be converted to a non-normalized floating-point format. For example, as noted above, the typical floating-point format may contain: a sign bit, E exponent bits, Mmantissa/significant bits. The following example may use a 16-bit floating point (FP16) representation such that each floating point number includes one sign bit, five exponent bits, and ten mantissa bits. The significand of the first addend may be formed by converting an unsigned-magnitude M-bit mantissa to 2's complement notation based upon the sign bit and implied 1 before the mantissa, forming a number that is now an M+2-bit 2's complement valued significand with an E-bit Exponent. Next, the significand of the first addend may be sign-extended by 7-bits. For example, if the significand equaled 12'h923 before, the significand may now equal 19'h7F923 after sign extension.

An arithmetic left-shift may then be applied to bits 0 to 7 of the significand of the first addend given three LSBs of the exponent, E, of the first addend. For example, if E[2:0]=000, the significand may be left shifted by 0 binary places. If E[2:0]=111, the significand may be left shifted by 7 binary places. Accordingly, for example, if the significand of the first addend equals 19'h7F923 and Exp[2:0]=4, after left shifting, the new significand of the first addend may equal 19'h79230 and the new exponent LSBs Exp[2:0] may equal 000. While the above example uses only three LSBs of the exponent, any number of LSBs of the exponent may be used. Three bits achieve a byte-level granularity to the new exponent. Two bits means new Exp[1:0]=00 and has nibble-level (e.g., 4-bit) granularity. Exp[3:0]=0000 means half-word (16-bit) level granularity, etc.

Thereafter, at step 304, the non-normalized floating-point format of the first addend may then be converted to circular representation. For example, assume a significand that is 32-bits, with an exponent that may be nine bits where the three LSBs of the exponent are now 000. This would be the case after calculating the product of two FP16 values. The exponent has byte-level granularity.

To convert to circular representation, the two bits Exp[5:4] may be used to rotate the bytes within the 32-bit significand. For example, assume a significand equal to 32'h12345678. According to aspects, if Exp[5:4]=00, the new (circularly-represented) significand of the first addend may equal 32'h12345678 (no change). According to aspects, if Exp[5:4]=01, the new significand of the first addend may equal 32'h34567812 (e.g., note the bit-positions of "12"). Further, according to aspects, if Exp[5:4]=10, the new significand of the first addend may equal 32'h56781234 (e.g., note the bit-positions of "12"). Further, according to aspects, if Exp[5:4]=11, the new significand of the first addend may equal 32'h78123456 (e.g., note the bit-positions of "12").

Thereafter, at step 306, after the first addend has been converted into circular representation, a bit-width associated with the first addend may be increased, if desired. According to aspects, maintaining a precision in an accumulator that is higher than an input addend precision may result in greater final accuracy through a dot product calculation. For example, to increase the bit-width associated with the first addend, the entire 32-bit addend may be replicated to form a 64-bit value. For example, given a 32-bit circular representation of 32'h78123456, now becomes 64h'7812345678123456.

Thereafter, at step 308, steps 302 through 306, described above, for to a non-normalized floating-point format, converting from the non-normalized floating-point format to the circular representation, and increasing the bit-width may then be applied to the second addend (e.g., corresponding to a first floating point number).

Thereafter, at step 310, a maximum (MAX) of the exponents of the first addend and the second addend may be determined. For example, suppose only two numbers are being added, such as the first addend and the second addend. Hereinafter, the first addend may be referred to as "A" and the second addend may be referred to as "B". The exponent of A, A_Exponent[8:0], may be 9'h118 while the exponent of B, B_Exponent[8:0], may be 9'h1c8. Here, the maximum would be 9'h1f8. Note that bits [2:0] for each exponent are still 000 from step 304.

Thereafter, at step 312, a difference between the maximum exponent and each the exponent of each of the first addend and the second addend may be determined. For example, the following calculations may be performed:

$$\text{MAX-}A\_\text{Exp}=9'h118-9'h1f8=9'h000 \text{ (e.g., bits[5:3]} =3'b000=0) \quad (\text{eq. 1})$$

$$\text{MAX-}B\_\text{Exp}=9'h1f8-9'h1c8=9'h030 \text{ (e.g., bits[5:3]} =3'b110=6) \quad (\text{eq. 2})$$

Note that, in some cases, these calculations may be redundant to the operations used in determining the maximum value (e.g., MAX=A if ((A_Exp−B_Exp)>0), else B_Exp).

Thereafter, at step 314, an "AND" mask for each addend A and B may be determined and shifted as needed (e.g., 1 bit for each byte of the significand). For example, assume there are 8 bytes in the 64-bit significand. Determining the AND mask may begin with 8'b00001111. A number of LSBs may then be set to 0 by the bits[5:3] of the difference found in step 312 beyond the number of bytes the numbers A and B were adjusted (e.g., increased) in step 306 above. For example, for number A, the difference determined in step 312 was 0, which is less than 4 (e.g., the number of bytes that A was adjusted in step 306). Accordingly, in this case, the AND mask remains 8'b00001111. Further, for B, the difference determined in step 312 was 6, which is 2 more than 4 (e.g., the number of bytes that B was adjusted in step 306). Accordingly, in this case, the AND mask is 8'b00001100. Thereafter, a circular left shift may be applied to the AND masks of A and B by exponent Exp[5:3]. For example, for A, for exponent=9'h1f8, bits [5:3]=111. Accordingly, after the left shift, the AND mask for A=8'b10000111. For B, for exponent=9'h1c8, bits [5:3]=001. Accordingly, after the left shift, the AND mask for B=8'b00011000.

Thereafter, at step 316, an "OR" mask for each addend A and B may be determined (e.g., 1 bit for each byte of the significand). For example, the shifted AND mask for each addend A and B may be inverted. For example, for addend B, AND mask 8'b00011000 becomes 8'b11100111. According to aspects, if the AND mask was all zeros, the OR mask may be all zeros too. Simply, the OR mask is 8'b00000000 if AND mask had been 8'b00000000. Thereafter, each bit of the OR mask may be ANDed with the MSB of the significand of each addend, which may simply be the sign-bit from the original floating-point representation. Alternately, the OR mask may be determined by bits [4:3] of the exponent when in circular representation. For example, for addend B, if the significand of addend B had been negative, the final OR mask is 8'b11100111. If the significand of addend B had been positive, then 8'b00000000.

Thereafter, at step 318, a new significand may be determined for each addend A and B, according to (old significand & AND Mask)|(OR Mask). Note, '&' represents a byte/bit-wise AND operation and '|' is an OR operation. For example, if the old Significand=64'h3456781234567812, AND mask=8'b00011000, OR mask=8'b00000000 (e.g., because the MSB='1' is positive), then the (old significand & AND mask)|(OR Mask)=64h'0000001234000000.

Thereafter, at step 320, a byte-granularity of where to break circular addition (e.g., end-around-carry addition) may be determined based upon bits [5:3] of the MAX exponent (e.g., determined in step 310). For example, if max exponent bits [5:3]=0, the carry-out above the 64-bit bit (8-th byte) may be ignored/masked. According to aspects, if max exponent bits [5:3]=1, the carry-out above the first byte may be ignored. Additionally, if max exponent bits [5:3]=2, the carry-out above the $2^{nd}$ byte may be ignored.

Thereafter, at step 322, the significands of the two addends A and B may be added, being cognizant of the ignored carry-out determined in step 20. For example, if adding 64h'0000001234000000 (e.g., A) to 64h'7800000000123456 (e.g., B), the resulting sum is 64'h7800001234123456 (e.g., where the bolded 12 is the MSB byte, ignored carry-out). In another example, if adding 64h'FFFFFF9234FFFFFF (e.g., A, which, here, is negative and sign extended) to 64h'7800000000123456, the resulting sum is 64'h77FFFF9234123456 (e.g., where the 12 is still the MSB byte, and the result contains a least significant nibble of 4, in bold, and not 5, since carry out was ignored).

Thereafter, at step 324, the exponent of the resulting sum may be determined, which is the maximum of the exponents of the two addends A and B.

Thereafter, at step 326, a number of sign-extension bytes that exist in the sum may be determined based upon Exp[5:3]. For example, for 64'h77FFFF9234123456, this 8-bit number represents where these sign-extended bytes might be: 8'b01100000. However, with Exp[5:3]=3, we start counting down from the $3^{rd}$ byte to find the first 0. Since this $3^{rd}$ byte is not a sign extension, the total sign-extension bytes is 0. In another example, for 64'h77FFFF9234FFFFD6, this 8-bit number represents where these sign-extended bytes might be: 8'b01100110. With Exp[5:3]=3, we start counting down from the $3^{rd}$ byte to find the first 0. Since this $3^{rd}$ byte is a 1, and there is one more 1 next to it, the number of sign extension bytes is 2. In some cases, determining the number of sign-extension bytes that exist may require approximately eight levels of logic for 64-bit significands.

Thereafter, at step 328, the number of sign extension bytes may be subtracted from Exp[8:3] (e.g., 6-bit subtraction), resulting in the next exponent for future calculations. The number of sign extension bytes may then be used in the determination of the AND mask during the next add operation.

Thereafter, at step 330, steps 310-328 may be repeated for multiple, sequential additions. Additionally, in some cases, these steps may be performed in groups of 3 addends at a time using 3:2 compressors to make all additions only a single level of logic (very fast).

Additionally, it should be noted that, unlike traditional floating point addition that requires shifting before and after calculation, the techniques described above in steps 302-328 do not require any subsequent shifting after two floating point numbers are added, reducing the complexity of the hardware and saving power and time.

Figure 4A:
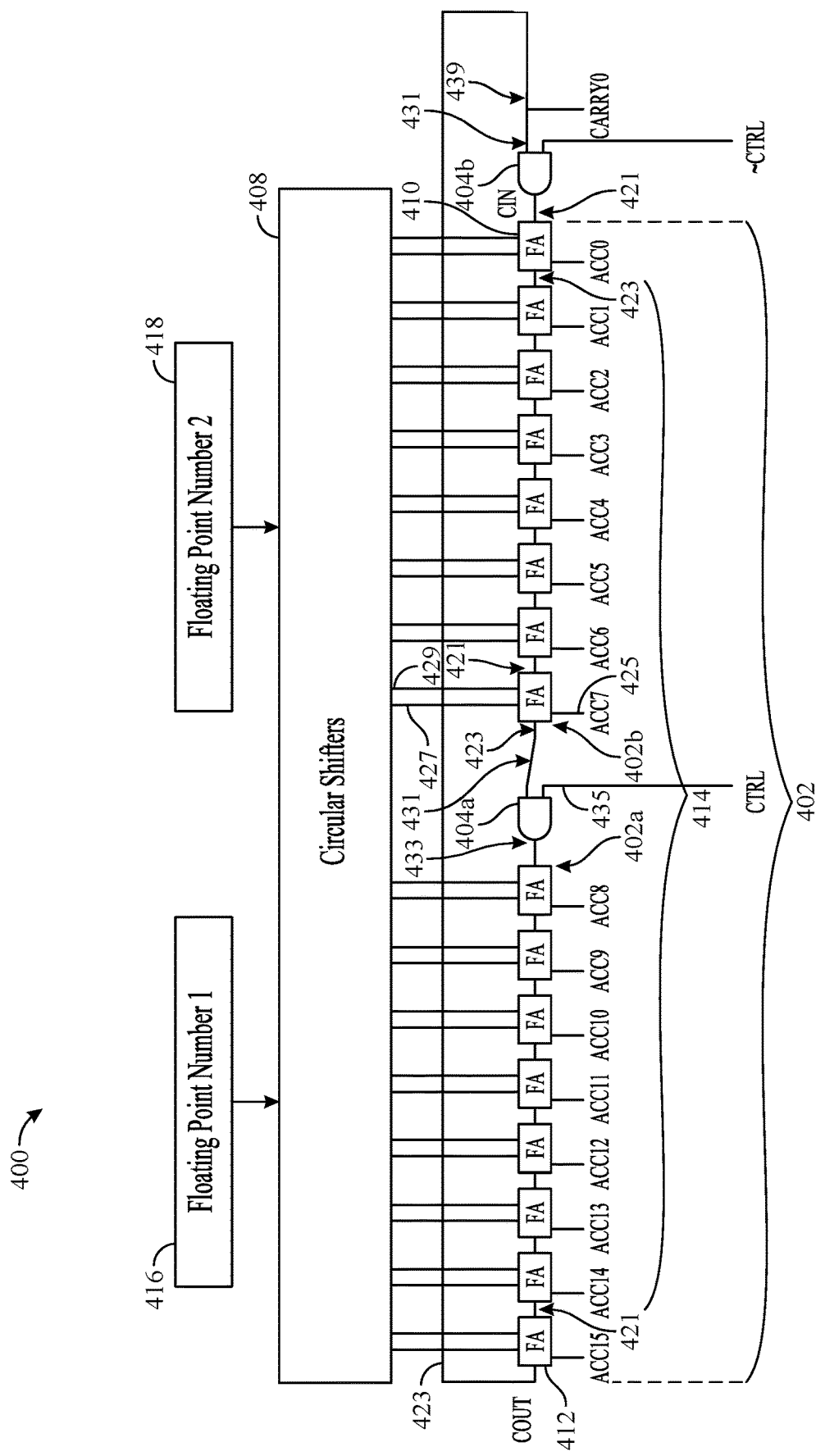
FIG. 4A illustrates an example circular accumulator device configured for floating point addition, according to certain aspects presented herein.

FIG. 4A illustrates a circular accumulator device 400 configured for floating point number addition, in accordance with certain aspects presented herein. For example, in some cases, the circular accumulator device 400 may be configured to perform the operations 300, described above.

As illustrated, the circular accumulator device 400 may include a plurality of full adder (FA) devices 402 coupled in series, a plurality of control devices 404 (e.g., control device 404a and control device 404b), and one or more circular shifter devices 408. In some cases, the circular shifter device 408 illustrated in FIG. 4 may include a plurality of circular shifters.

According to aspects, each adder device of the plurality of adder devices 402 comprises at least a carry-in input 421, a carry-out output 423, a sum output 425, a first addend input 427, and a second addend input 429. Further, as illustrated, the plurality of adder devices 402 comprises at least a first adder device 410, a last adder device 412, and a plurality of intermediate adder devices 414. Further, as illustrated, the plurality of intermediate adder devices 414 are connected in series between the carry-out output 423 of the first adder device 410 and the carry-in input 421 of the last adder device 412. Additionally, as shown, the carry-out output 423 of the last adder device 412 is coupled with the carry-in input 421 of the first adder device 410 forming a combinatorial loop.

Additionally, as shown, each control device 404a and 404b of the plurality of control devices 404 comprises an input 431, an output 433, and a control signal input 435. Additionally, as shown, at least one control device 404a of the plurality of control devices 404 may be inserted in series between one or more pairs of adder devices of the plurality of adder devices 402, such as between the adder device 402a and the adder device 402b.

According to aspects, at least one control device of the plurality control devices 404a may, in some cases, be configured to pass a carry-out bit from one adder device of the plurality of adder devices 402 to the carry-in input 421 of another adder device of the plurality of adder devices 402 when a control signal is applied to the control signal input 435 of the at least one control device of the plurality of control devices 404a. In other cases, the at least one control device of the plurality of control devices 404a may be configured to not pass the carry-out output bit of the one adder device of the plurality of adder devices 402 to the carry-in input of the other adder device of the plurality of adder devices 402 when the control signal is removed from the control signal input 435 of the at least one control device of the plurality control devices 404a. In some cases, the combinatorial loop may be broken when the control signal input 435 of the at least one control device of the plurality control devices 404a is configured to not pass the carry-out output bit of the one adder device of the plurality of adder devices 402 to the carry-in input of the other adder device of the plurality of adder devices 402.

In some cases, a second control device 404b of the plurality control devices 404 may be inserted in series between the carry-out output 423 of the last adder device 412 and the carry-in input 421 of the first adder device 410.

As noted above, the circular accumulator device 400 may include the one or more circular shifter devices 408. In some cases, the circular shifter device may be configured to obtain a first floating point number 416 represented by a first significand and a first exponent. Additionally, the one or more circular shifter devices 408 may also be configured to obtain a second floating point number 418 represented by a second significand and second exponent.

Additionally, in some cases, the one or more circular shifter devices 408 may be configured to shift the first significand based on the first exponent to generate a first circularly-shifted floating point number comprising a first plurality of bits and shift the second significand based on the second exponent to generate a second circularly-shifted floating point number comprising a second plurality of bits, for example, as described above with reference to 314 of the operations 300.

Additionally, in some cases, the one or more circular shifter devices 408 may be further configured to mask one or more least significant bits of the second plurality of bits that have bit positions in the second circularly-shifted floating point number corresponding to one or more most significant bits of the first circularly-shifted floating point number, as described above with reference to the operations 300. In some cases, the one or more circular shifter devices 408 may be configured to mask the one or more least significant bits of the second plurality of bits based on the second exponent being less than the first exponent. In some cases, the one or more circular shifter devices 408 may be configured to mask the one or more least significant bits by sign extending one or more most significant bits of the second plurality of bits to replace the one or more least significant bits of the second plurality of bits.

Further, according to aspects, the circular accumulator device 400 may be configured to perform floating point number addition of the first circularly-shifted floating point number and the second circularly-shifted floating point number. For example, each first addend input 427 of each adder device 402 may correspond to a different bit of the first plurality of bits of the first circularly-shifted floating point number and each second addend input 429 of each adder device 402 may correspond to a different bit of the second plurality of bits of the second circularly-shifted floating point number. Accordingly, in some cases, each adder device 402 may be configured to add the bit of the first plurality of bits corresponding to the first addend input with the bit of the second plurality of bits corresponding to the second addend input and with the corresponding carry-in bit, generate a sum output bit based on the addition, and generate, based on the addition, a carry-out output bit to be input into the carry-in input of another adder device.

According to aspects, during the addition of the circularly-shifted floating point numbers, the plurality of control devices 404 may be configured to break the combinatorial loop at a position between two adder devices (e.g., 402a and 402b, as an example) of the plurality of adder device 402 where a carry-out output bit of a first adder device 402b of the two adder devices, corresponding to a most significant bit of the addition, is to be input into the carry-in input of a second adder device 402*a* of the two adder devices that corresponds to a least significant bit of the addition. In other words, as noted above, the combinatorial loop may be broken by not passing the carry-out output 423 bit of the first adder device 402*b* of the two adder devices to the carry-in input 421 of the second adder device 402*a* of the two adder devices. According to aspects, breaking the combinatorial loop at this position may prevent a carry-out output from a most significant bit of the addition from being carried into a least significant bit position.

In some cases, the circular accumulator device 400 may be configured to store the sum output bit of each adder device 402 (e.g., ACC0-ACC15, as shown) of the plurality of adder devices for a subsequent addition, as described above. Additionally, in some cases, the circular accumulator device 400 may also store the carry-out bit of the first adder device 402*b* of the two adder devices, corresponding to a most significant bit of the addition, in memory for a subsequent addition, as described above with reference to the operations 300.

Figure 4B:
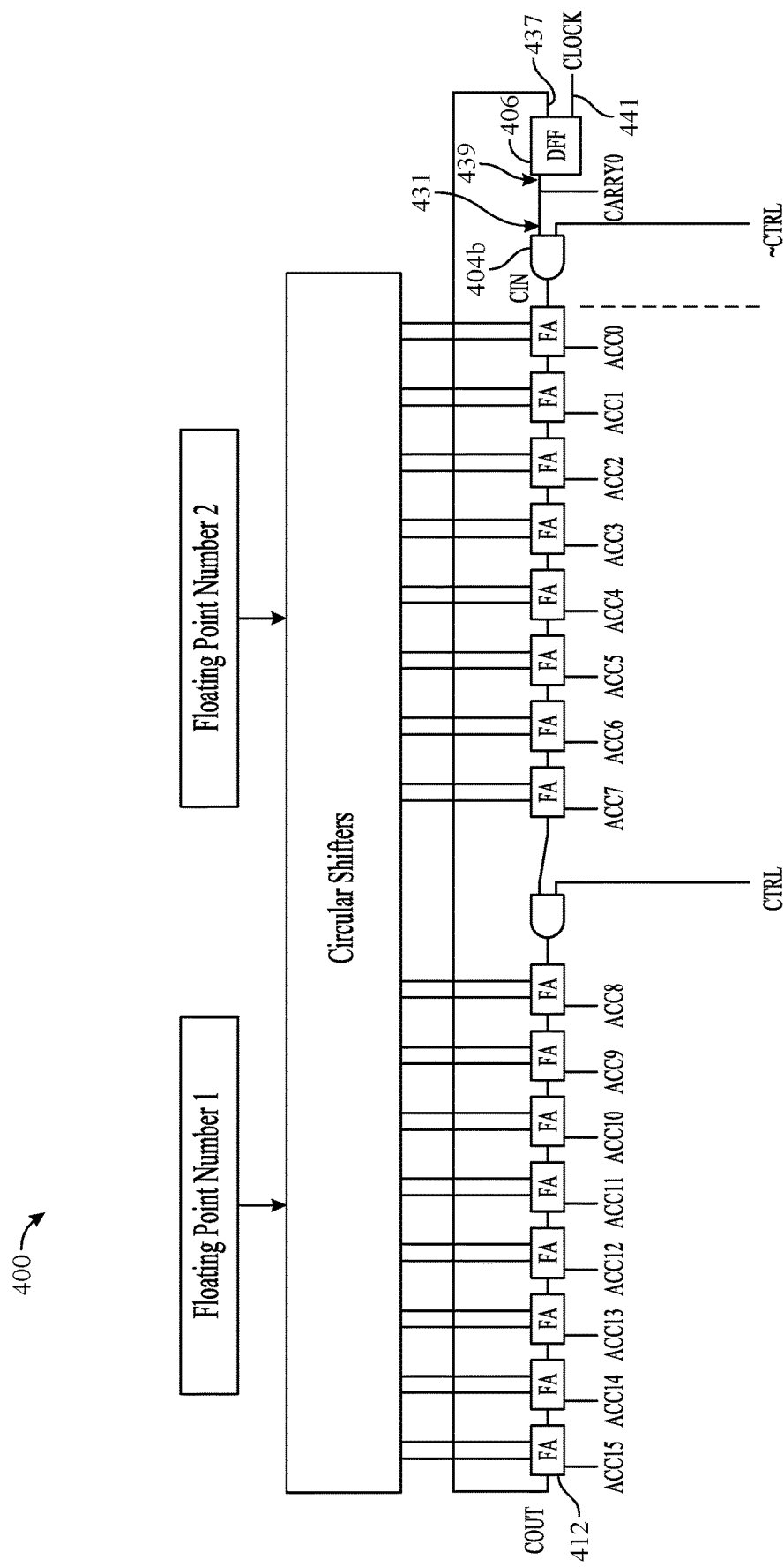
FIG. 4B illustrates an example circular accumulator device configured for floating point addition including one or more flip-flop devices, according to certain aspects presented herein.

Further, as noted above, the circular accumulator device 400 may include one or more flip-flop devices 406, as illustrated in FIG. 4B. In some cases, the one or more flip-flop devices 406 may comprise one or more data flip-flop (DFF) devices. In some cases, each flip-flop device of the one or more flip-flop devices 406 comprises a data input 437, a data output 439, and a clock signal input 441. According to aspects, the one or more flip-flop devices may be configured to delay a carry-out bit from one adder device of the plurality of adder devices based on the clock signal input. Additionally, as shown, the data input 437 may be coupled with the carry-out output of the last adder device 412 and is configured to receive a carry-out bit from the last adder device 412. Further, the data output of the one or more flip-flop devices 406 may be coupled with the input 431 of at least one control device of the plurality of control devices, such as the control device 404*b*.

Figure 5:
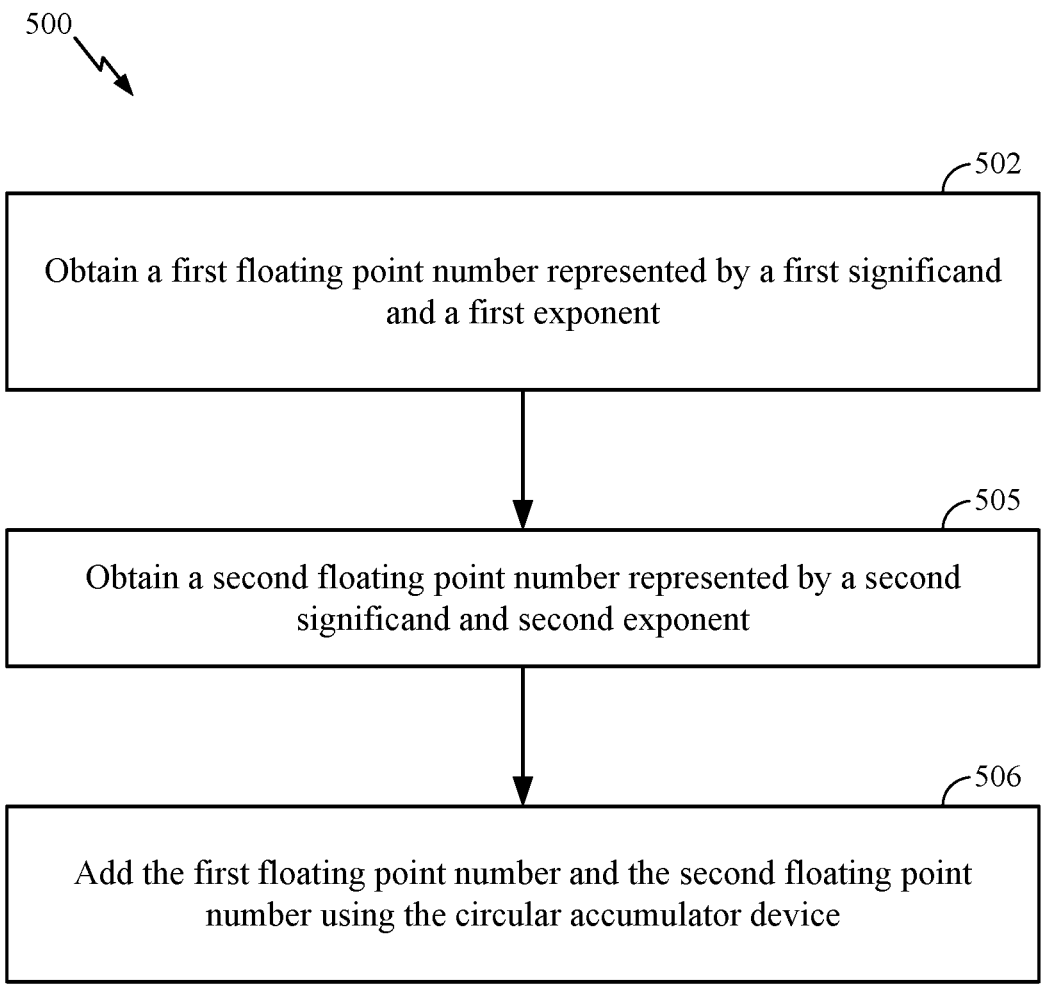
FIG. 5 illustrates example operations for operating a circular accumulator device for floating point number addition, according to certain aspects presented herein.

FIG. 5 illustrates example operations 500 for operating a circular accumulator device for floating point number addition, according to aspects presented herein. In some cases, the circular accumulator device may include the circular accumulator device 400 illustrated in one or more of FIG. 4A or 4B.

Operations 500 begin at block 502 by obtaining a first floating point number represented by a first significand and a first exponent.

At block 504, the circular accumulator device obtains a second floating point number represented by a second significand and second exponent.

At block 506, the circular accumulator device adds the first floating point number and the second floating point number.

Operations 500 may also include shifting the first significand based on the first exponent to generate a first circularly-shifted floating point number comprising a first plurality of bits. Additionally, operations 500 may also include shifting the second significand based on the second exponent to generate a second circularly-shifted floating point number comprising a second plurality of bits.

Additionally, operations 500 may further include masking one or more least significant bits of the second plurality of bits that have bit positions in the second circularly-shifted floating point number corresponding to one or more most significant bits of the first circularly-shifted floating point number. Additionally, in some cases, operations 500 may further include masking the one or more least significant bits of the second plurality of bits based on the second exponent being less than the first exponent. In some cases, masking the one or more least-significant bits may include sign-extending one or more most-significant bits of the second plurality of bits to replace the one or more least significant bits of the second plurality of bits.

In some cases, adding the first floating point number and the second floating point number using the circular accumulator device may comprise adding the first circularly-shifted floating point number and the second circularly-shifted floating point number.

Additionally, in some cases, operations 500 may also include one or more of the operations illustrated in FIG. 3.

Figure 6:
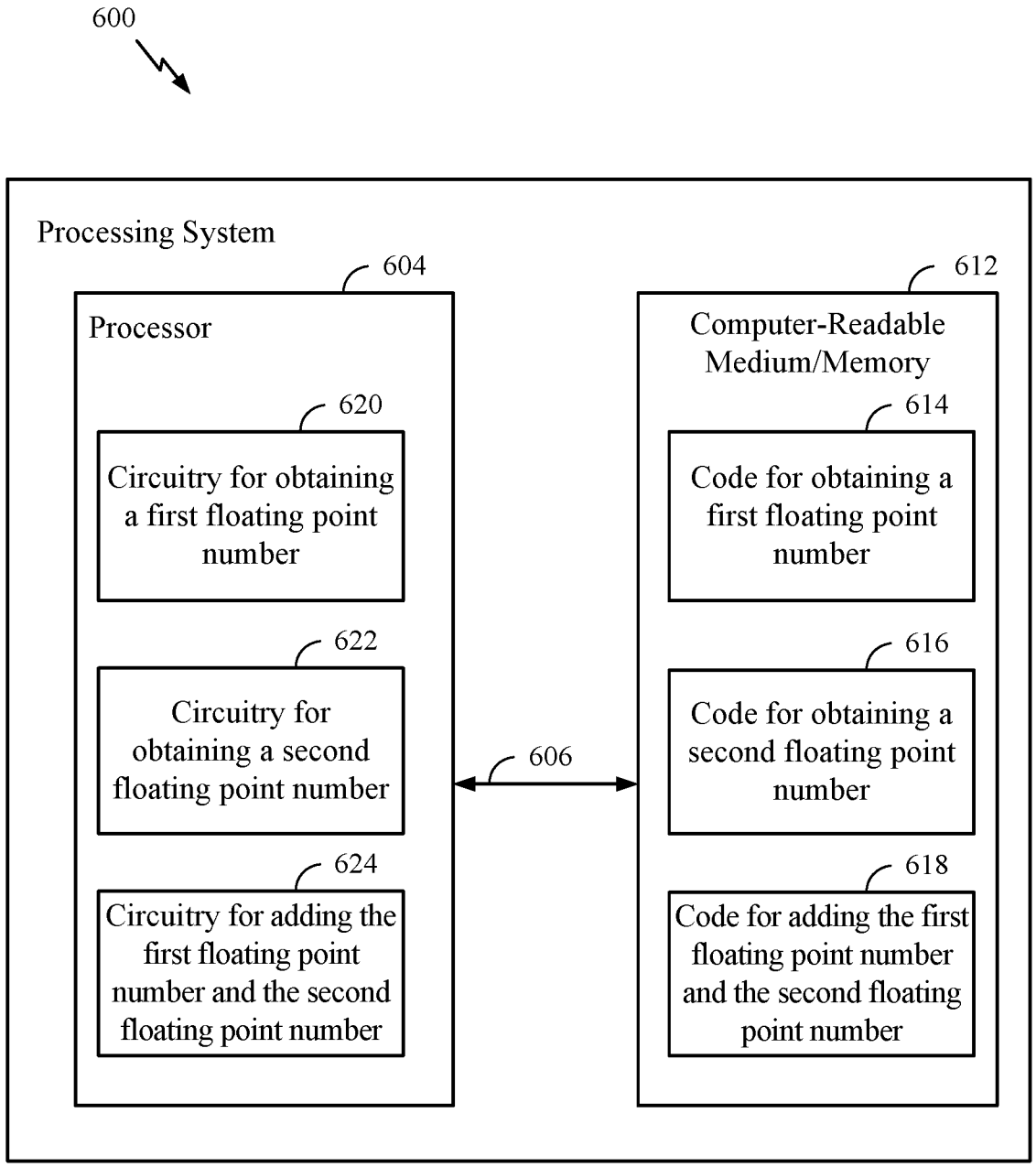
FIG. 6 illustrates an electronic device that may include various components configured to perform operations for the techniques disclosed herein in accordance with aspects of the present disclosure.

FIG. 6 illustrates a electronic device 600 that may include various components (e.g., corresponding to means-plus-function components) configured to perform operations for the techniques disclosed herein, such as the operations illustrated in FIG. 5, as well as other operations disclosed herein for operating a circular accumulator device for floating point number addition. The electronic device 600 includes a processing system 602 configured to perform processing functions for the electronic device 600, including processing functions for performing circular floating point addition.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 5, or other operations for operating a circular accumulator device for floating point number addition. In certain aspects, computer-readable medium/memory 612 stores code for performing the operations illustrated in one or more of FIG. 5 as well as other operations disclosed herein for operating a circular accumulator device for floating point number addition. For example, computer-readable medium/memory 612 stores code 614 for obtaining a first floating point number represented by a first significand and a first exponent, code 616 for obtaining a second floating point number represented by a second significand and second exponent, and code 618 for adding the first floating point number and the second floating point number using the circular accumulator device.

In certain aspects, the processor 604 may include circuitry configured to implement the code stored in the computer-readable medium/memory 612, such as for performing the operations illustrated in FIG. 5 as well as other operations disclosed herein for operating a circular accumulator device for floating point number addition. For example, the processor 604 includes circuitry 620 for obtaining a first floating point number represented by a first significand and a first exponent, circuitry 622 for obtaining a second floating point number represented by a second significand and second exponent, and circuitry 624 for adding the first floating point number and the second floating point number using the circular accumulator device. In some cases, the circuitry 620, 622, and 624 may comprise circuitry for the circular accumulator device 400 illustrated in FIG. 4.

Additionally, while not illustrated in FIG. 6, in some cases, the computer-readable medium/memory 612 stores code for the operations illustrated in FIG. 3. For example, in some cases, computer-readable medium/memory 612 stores code for operation 302 for converting from a typical floating-point format to a non-normalized floating-point format; code for operation 304 for converting from non-normalized floating-point format to circular representation; code for operation 306 for increasing a bit-width; code for operation 308 for repeating operations 302-306 for a second addend for circular addition; code for operation 310 for determining a maximum (MAX) of the exponents of the first addend and the second addend; code for operation 312 for determining a difference between the maximum exponent and each the exponent of each of the first addend and the second addend; code for operation 314 for determining an "AND" mask for each addend; code for operation 316 for determining an "OR" mask for each addend; code for operation 318 for determining new significand for each addend; code for operation 320 for determining a byte-granularity of where to break circular addition; code for operation 322 for adding significands of the two addends; code for operation 324 for determining an exponent of the sum of the two addends; code for operation 326 for determining a number of sign-extension bytes that exist in the sum; code for operation 328 for subtracting the number of sign extension bytes from the exponent of the sum; and code for operation 330 for repeating operations 302-328 for a new addition.

Additionally, while not illustrated in FIG. 6, in some cases, the processor 604 includes circuitry for performing the operations illustrated in FIG. 3. For example, in some cases, processor 604 includes circuitry for operation 302 for converting from a typical floating-point format to a non-normalized floating-point format; circuitry for operation 304 for converting from non-normalized floating-point format to circular representation; circuitry for operation 306 for increasing a bit-width; circuitry for operation 308 for repeating operations 302-306 for a second addend for circular addition; circuitry for operation 310 for determining a maximum (MAX) of the exponents of the first addend and the second addend; circuitry for operation 312 for determining a difference between the maximum exponent and each the exponent of each of the first addend and the second addend; circuitry for operation 314 for determining an "AND" mask for each addend; circuitry for operation 316 for determining an "OR" mask for each addend; circuitry for operation 318 for determining new significand for each addend; circuitry for operation 320 for determining a byte-granularity of where to break circular addition; circuitry for operation 322 for adding significands of the two addends; circuitry for operation 324 for determining an exponent of the sum of the two addends; circuitry for operation 326 for determining a number of sign-extension bytes that exist in the sum; circuitry for operation 328 for subtracting the number of sign extension bytes from the exponent of the sum; and circuitry for operation 330 for repeating operations 302-328 for a new addition. The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3 and 5 as well as other operations for operating a circular accumulator device for floating point number addition.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A circular accumulator device configured for performing floating point number addition, comprising:
   a plurality of adder devices coupled in series, wherein:
      each adder device of the plurality of adder devices comprises at least a carry-in input, a carry-out output, a sum output, a first addend input, and a second addend input;
      the plurality of adder devices comprises at least a first adder device, a last adder device, and a plurality of intermediate adder devices;
      the plurality of intermediate adder devices are connected in series between the carry-out output of the first adder device and the carry-in input of the last adder device;

the carry-out output of the last adder device is coupled with the carry-in input of the first adder device forming a combinatorial loop;
a plurality of control devices, wherein:
each control device of the plurality of control devices comprises a carry-in input, a carry-out output, and a control signal input; and
at least one control device of the plurality of control devices is inserted in series between one or more pairs of adder devices of the plurality of adder devices; and
a circular shifter device configured to:
obtain a first floating point number represented by a first significand and a first exponent;
obtain a second floating point number represented by a second significand and second exponent;
shift the first significand based on the first exponent to generate a first circularly-shifted floating point number comprising a first plurality of bits; and
shift the second significand based on the second exponent to generate a second circularly-shifted floating point number comprising a second plurality of bits, wherein the circular accumulator device is configured to perform floating point number addition of the first circularly-shifted floating point number and the second circularly-shifted floating point number using plurality of adder devices and the plurality of control devices.

2. The circular accumulator device of claim 1, wherein the at least one control device of the plurality control devices is configured to:
pass a carry-out output bit from one adder device of the plurality of adder devices to the carry-in input of another adder device of the plurality of adder devices when a control signal is applied to the control signal input of the at least one control device of the plurality of control devices; and
not pass the carry-out output bit of the one adder device of the plurality of adder devices to the carry-in input of the other adder device of the plurality of adder devices when the control signal is removed from the control signal input of the at least one control device of the plurality control devices.

3. The circular accumulator device of claim 2, wherein the combinatorial loop is broken when the control signal input of the at least one control device of the plurality control devices is configured to not pass the carry-out output bit of the one adder device of the plurality of adder devices to the carry-in input of the other adder device of the plurality of adder devices.

4. The circular accumulator device of claim 1, wherein a second control device of the plurality of control devices is inserted in series between the carry-out output of the last adder device and the carry-in input of the first adder device.

5. The circular accumulator device of claim 1, wherein the circular shifter device is further configured to mask one or more least significant bits of the second plurality of bits that have bit positions in the second circularly-shifted floating point number corresponding to one or more most significant bits of the first circularly-shifted floating point number.

6. The circular accumulator device of claim 5, wherein the circular shifter device is configured to mask the one or more least significant bits of the second plurality of bits based on the second exponent being less than the first exponent.

7. The circular accumulator device of claim 5, wherein the circular shifter device is configured to mask the one or more least significant bits by sign extending one or more most significant bits of the second plurality of bits to replace the one or more least significant bits of the second plurality of bits.

8. The circular accumulator device of claim 1, wherein:
each first addend input of each adder device corresponds to a different bit of the first plurality of bits of the first circularly-shifted floating point number; and
each second addend input of each adder device corresponds to a different bit of the second plurality of bits of the second circularly-shifted floating point number.

9. The circular accumulator device of claim 8, wherein each adder device is configured to:
add the bit of the first plurality of bits corresponding to the first addend input with the bit of the second plurality of bits corresponding to the second addend input; and
generate a sum output bit based on the addition; and
generate, based on the addition, a carry-out output bit to be input into the carry-in input of another adder device.

10. The circular accumulator device of claim 9, wherein the plurality of control devices are configured to break the combinatorial loop at a position between two adder devices of the plurality of adder devices where a carry-out output bit of a first adder device of the two adder devices, corresponding to a most significant bit of the addition, is to be input into the carry-in input of a second adder device of the two adder devices that corresponds to a least significant bit of the addition.

11. The circular accumulator device of claim 10, wherein the circular accumulator device is configured to store the sum output bit of a first adder device of the two adder devices, corresponding to a most significant bit of the addition, in memory for a subsequent addition.

12. The circular accumulator device of claim 1, further comprising one or more flip-flop devices, wherein:
each flip-flop device of the one or more flip-flop devices comprises a data input, a data output, and a clock signal input;
the one or more flip-flop devices are configured to delay a carry-out bit from one adder device of the plurality of adder devices based on the clock signal input;
the data input is coupled with the carry-out output of the last adder device and is configured to receive a carry-out bit from the last adder device; and
the data output of the one or more flip-flop devices is coupled with the carry-in input of the at least one control device of the plurality of control devices.

13. A method for operating a circular accumulator device for floating point number addition, comprising:
obtaining, by the circular accumulator device, a first floating point number represented by a first significand and a first exponent;
obtaining, by the circular accumulator device, a second floating point number represented by a second significand and second exponent;
shifting the first significand based on the first exponent to generate a first circularly-shifted floating point number comprising a first plurality of bits; and
shifting the second significand based on the second exponent to generate a second circularly-shifted floating point number comprising a second plurality of bits; and
adding, by the circular accumulator device, the first circularly-shifted floating point number and the second circularly-shifted floating point number using a plurality of adder devices of the circular accumulator device coupled in series and a plurality of control devices of the circular accumulator device, wherein:

each adder device of the plurality of adder devices comprises at least a carry-in input, a carry-out output, a sum output, a first addend input, and a second addend input;

the plurality of adder devices comprises at least a first adder device, a last adder device, and a plurality of intermediate adder devices;

the plurality of intermediate adder devices are connected in series between the carry-out output of the first adder device and the carry-in input of the last adder device;

the carry-out output of the last adder device is coupled with the carry-in input of the first adder device forming a combinatorial loop;

each control device of the plurality of control devices comprises a carry-in input, a carry-out output, and a control signal input; and at least one control device of the plurality of control devices is inserted in series between one or more pairs of adder devices of the plurality of adder devices.

14. The method of claim 13, further comprising masking one or more least significant bits of the second plurality of bits that have bit positions in the second circularly-shifted floating point number corresponding to one or more most significant bits of the first circularly-shifted floating point number.

15. The method of claim 14, wherein:
masking the one or more least significant bits of the second plurality of bits is based on the second exponent being less than the first exponent; and
masking the one or more least significant bits comprises sign extending one or more most significant bits of the second plurality of bits to replace the one or more least significant bits of the second plurality of bits.

16. A non-transitory computer-readable medium for operating a circular accumulator device for floating point number addition, comprising:
instructions that, when executed by at least one processor, cause the at least one processor to:

obtain a first floating point number represented by a first significand and a first exponent;
obtain a second floating point number represented by a second significand and second exponent; and
shift the first significand based on the first exponent to generate a first circularly-shifted floating point number comprising a first plurality of bits; and
shift the second significand based on the second exponent to generate a second circularly-shifted floating point number comprising a second plurality of bits; and
add the first circularly-shifted floating point number and the second circularly-shifted floating point number using a plurality of adder devices of the circular accumulator device coupled in series and a plurality of control devices of the circular accumulator device, wherein:
each adder device of the plurality of adder devices comprises at least a carry-in input, a carry-out output, a sum output, a first addend input, and a second addend input;
the plurality of adder devices comprises at least a first adder device, a last adder device, and a plurality of intermediate adder devices;
the plurality of intermediate adder devices are connected in series between the carry-out output of the first adder device and the carry-in input of the last adder device;
the carry-out output of the last adder device is coupled with the carry-in input of the first adder device forming a combinatorial loop;
each control device of the plurality of control devices comprises a carry-in input, a carry-out output, and a control signal input; and
at least one control device of the plurality of control devices is inserted in series between one or more pairs of adder devices of the plurality of adder devices.

\* \* \* \* \*